(12) United States Patent
Rune

(10) Patent No.: US 8,391,226 B2
(45) Date of Patent: Mar. 5, 2013

(54) METHOD AND APPARATUS FOR USE IN A COMMUNICATIONS NETWORK

(75) Inventor: Johan Rune, Lidingö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 217 days.

(21) Appl. No.: 12/744,888

(22) PCT Filed: Nov. 26, 2007

(86) PCT No.: PCT/EP2007/062799
§ 371 (c)(1),
(2), (4) Date: May 26, 2010

(87) PCT Pub. No.: WO2009/068076
PCT Pub. Date: Jun. 4, 2009

(65) Prior Publication Data
US 2010/0303031 A1    Dec. 2, 2010

(51) Int. Cl.
*H04W 4/00* (2009.01)
(52) U.S. Cl. ........................................ 370/329
(58) Field of Classification Search ......... 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–522, 370/521–529, 523–520
See application file for complete search history.

(56) References Cited

U.S. PATENT DOCUMENTS

| | | | | |
|---|---|---|---|---|
| 2007/0268919 | A1* | 11/2007 | Sarikaya et al. | 370/401 |
| 2008/0256220 | A1* | 10/2008 | Bachmann et al. | 709/222 |
| 2008/0298303 | A1* | 12/2008 | Tsirtsis | 370/328 |
| 2009/0022126 | A1* | 1/2009 | Damle et al. | 370/338 |
| 2009/0290529 | A1* | 11/2009 | Toyokawa et al. | 370/315 |
| 2010/0027509 | A1* | 2/2010 | Velev et al. | 370/331 |

FOREIGN PATENT DOCUMENTS

WO    WO 2007/035016 A    4/2007

* cited by examiner

*Primary Examiner* — Kwang B Yao
*Assistant Examiner* — Jung-Jen Liu

(57) ABSTRACT

A method for use in a communications network in which a Mobile Node accesses the communications network via a proxy node. An access control node receives attachment information from the proxy node. The attachment information relates to an attachment to the communications network of the Mobile Node and includes an identifier of the Mobile Node. On the basis of the received information, a Binding Unique Identifier is determined to associate with a Care-of-Address used by the proxy node on behalf of the Mobile Node. The Binding Unique Identifier is sent to the proxy node for subsequent registration with a mobility anchor function.

12 Claims, 4 Drawing Sheets

METHOD AND APPARATUS FOR USE IN A COMMUNICATIONS NETWORK

TECHNICAL FIELD

The present invention relates to communications networks, and in particular to a method for use in a Proxy Mobile IP communications network.

BACKGROUND

Mobile IPv6 (MIPv6), which is described in IETF RFC 3775, allows users of mobile communications devices to move from one network to another whilst maintaining a permanent IP address, regardless of which network they are in. This allows the user to maintain connections whilst on the move. For example, if a user were participating in a Voice Over IP (VoIP) session and, during the session the user moved from one network to another, without MIPv6 support the user's IP address may change. This would lead to problems with the VoIP session.

A Mobile Node (MN) is allocated two IP addresses: a permanent home address and a care-of address (CoA). The CoA is associated with an access network that the user is currently visiting. To communicate with the MN, packets are sent to the MN home address. These packets are intercepted by a Home Agent (HA) in the home network, which has knowledge of the current CoA. The Home Agent then tunnels the packets to the CoA of the MN with a new IP header, whilst preserving the original IP header. When the packets are received by the MN, it removes the new IP header and obtains the original IP header. The MN sends packets to another node by tunneling them to the HA, encapsulated in packets addressed to the HA. For each packet, the HA removes the encapsulating packet, restores the original packet and forwards it to the intended destination node.

Proxy Mobile IPv6 (PMIPv6), IETF draft-sgundave-mip6-proxymip6-02, describes a Mobile Access Gateway (MAG) function. This function emulates home link properties in order to make a MN behave as though it is on its home network and allows support for mobility on networks that would not otherwise support MIPv6. A key difference between PMIPv6 and MIPv6 is that using MIPv6, a MN has control of its own mobility signalling, whereas using PMIPv6, a MN does not have control of its mobility signalling. The basic components of a PMIPv6 architecture are illustrated in FIG. 1.

A MAG 101 is usually implemented at the access router. The MAG 101 sends and receives mobility related signalling on behalf of a MN 102. When a MN 102 connects to an access router having a MAG 101, the MN 102 presents its identity in the form of a Network Access Identifier (NAI) as part of an access authentication procedure. Once the MN 102 has been authenticated, the MAG obtains the user's profile from a policy store. The MAG 101, having knowledge of the user profile and the NAI, can now emulate the MN's home network. The MN 102 subsequently obtains its home address from the MAG. The MAG 101 also informs the MN's 102 Local Mobility Anchor (LMA) 103 of the current location of the MN 102 using a Proxy Binding Update message. The Proxy Binding Update message uses the NAI of the MN 102. Upon receipt of the Proxy Binding Update message, the LMA 103 sets up a tunnel to the MAG 101 and sends a Proxy Binding Acknowledgement to the MAG. On receipt of the Proxy Binding Acknowledgement, the MAG 101 sets up a tunnel to the LMA, effectively forming a bidirectional tunnel. All traffic to and from the MN 102 is routed through the LMA 103 via the bidirectional tunnel. A MAG may serve many MNs associated with the same LMA. The MAG and the LMA do not need to have a dedicated bidirectional tunnel for each MN. Instead the same bidirectional tunnel can be used for the traffic of all the MNs that are associated with the same LMA and that are currently being served by the same MAG.

The LMA 103 intercepts any packet that is sent to the MN 102, and forwards the intercepted packet to the MAG 101 through the tunnel. On receipt of the packet, the MAG 101 removes the tunnel header and sends the packet to the MN 102. The MAG 101 acts as a default router on the access link. Any packets sent from the MN are sent via the MAG 101 through the tunnel to the LMA 103, which then sends the packet on to its ultimate destination.

Simultaneous Multi-Access describes a function of a communications network that allows a MN to combine different radio and/or fixed access technologies, as illustrated in FIG. 2. The MN 102 can simultaneously use several interfaces and different access networks (AN1 and AN2), which may employ different access technologies, in a communications session. Different traffic flows, belonging to different applications, can be transferred between different access networks, independently of each other.

MIPv6 can be extended to support Simultaneous Multi-Access (see R. Wakikawa et al., "Multiple Care-of Addresses Registration", Internet-Draft draft-ietf-monami6-multiple-coa-02, March 2007). Where more than one access is used, a MN has a CoA for each access. A Binding Unique Identifier (BID) is associated with each CoA, and the BID indicates which CoA a Binding Update (BU) relates to. If the BID associated with a new CoA is already in use, the new CoA replaces the one previously associated with the BID, whereas if the BID is not already in use, the new CoA is added to any previously existing CoAs. Since MIPv6 is host-centric (that is to say, the MN is in control of its mobility signalling), with all the mobility signalling flowing between the MN and the HA, the MN has a complete overview and complete control of how CoAs are added to or replacing each other, by assigning the BIDs appropriately.

The mechanisms described in R. Wakikawa et al., "Multiple Care-of Addresses Registration" can also be used to extend PMIPv6 in order to provide PMIPv6 with simultaneous multi-access capabilities. However, using PMIPv6, the MN is not in control of its mobility signalling. As described above, mobility signalling is handled by a MAG on behalf of the MN. A Proxy Binding Update (PBU) is triggered when the MN attaches to an access and the MAG responsible for the access. This means that a MN has no way of indicating its intentions regarding how the accesses are to be used in terms of PMIPv6, i.e. whether a new access should be added to the already used accesses or replace one or more old one(s).

Furthermore, even if a MAG did know whether a new CoA should be added to the existing CoAs or replace an old one, it would not know which BIDs other MAGs in the network have assigned to the existing CoAs, so it could not ensure the new CoA replaces another CoA (by assigning the same BID to the new CoA), nor could it ensure that the new CoA is added to the existing CoAs (by assigning a unique BID to the new CoA). This lack of coordination of BID assignment is a problem.

In a simultaneous multi-access scenario it is not only desirable to be able to control how accesses (and thus CoAs and BIDs) are managed in terms of additions and/or replacements of CoAs, but also to be able to control which data flows are sent over which accesses. One way to control data flow management is by using filter rules.

Filter rule management is designed to handle flow management in simultaneous multi-access scenarios as described in Internet-Draft "A Filter Rule Mechanism for Multi-access Mobile IPv6" (draft-larsson-monami6-filter-rules-02). A filter rule comprises a match expression and a virtual interface identifier, termed a Filter Interface Identifier (FIID). A filter rule indicates through which interface or to which CoA a data packet matching the match expression should be routed.

To associate a filter rule with a specific interface or CoA, the filter rule's FIID is bound to an interface (for packets to be sent from the node the filter rule relates to) or a mobility protocol specific identifier, for example a BID (for packets to be sent to the node the filter rule pertains to). The latter type of FIID binding (binding the FIID to a mobility protocol specific identifier such as a BID) must be signalled to nodes that are to send packets to the node that the filter rule relates to (e.g. a Home Agent or a correspondent node using the MIPv6 route optimization mode or a PMIPv6 LMA). Although filter rule management has been designed to be independent of the mobility protocol, it is particularly suitable for MIPv6. The signalling of FIID-BID bindings is integrated in the signalling described in Internet-Draft "Filter Interface Identifier Binding in Mobile IPv6" (draft-kauppinen-monami6-binding-filter-rule-00) [5]. Specifically FIID-BID bindings are signalled in Binding Updates.

Filter rules (and FIID-interface bindings) are typically created (or otherwise installed) in the MN, which is normally the entity that has an overview of the available accesses, the relevant applications and the user's preferences. The filter rules for outgoing packets (from the MN) need only be stored locally in the MN, whereas the MN sends the filter rules for incoming packets (destined for the MN) to nodes that need them, e.g. its MIPv6/monami6 HA and CNs (using route optimization), and signals the appropriate FIID bindings (e.g. FIID-BID bindings) to these nodes.

However, the mechanisms described in Internet-Draft "Filter Interface Identifier Binding in Mobile IPv6" (draft-kauppinen-monami6-binding-filter-rule-00) are not the only possible ways to bind a filter rule to a BID and to signal such a binding to a remote node. Similarly, using an FIID is not the only way to identify a filter rule. Alternative, albeit similar, mechanisms are described in the Internet-Draft "Flow Bindings in Mobile IPv6 and Nemo Basic Support" (draft-soliman-monami6-flow-binding-04). In this Internet-Draft a Flow Identifier (FID) in combination with the MN's home address are used to identify a flow and its binding. A flow is defined using the same kind of parameters as a match expression of a filter rule (which is used to match the flow to which the filter rule applies) and hence a flow description and a filter rule match expression essentially define the same thing. Internet-Draft draft-soliman-monami6-flow-binding-04 also uses Binding Updates to signal filter rule/flow-to-BID bindings to a remote node, e.g. a Home Agent or a CN, although FIDs are used instead of FIIDs.

There are therefore different means to identify a filter rule/flow (e.g. an FIID, an FID or a combination of a home address and an FID). For the purpose of the present invention the specific details of the identification means are not essential. The general term 'filter rule identifier' is used herein to refer to any type of filter rule/flow identifier, examples of which include a FIID, a FID or a combination of a home address and a FID. Similarly, the term 'filter rule-BID binding' is used herein to refer to a binding between a filter rule and a BID in general, whether it is using an FIID, an FID, a combination of a home address and an FID or any other means to identify the filter rule being bound to a BID. Consequently, the term 'filter rule-interface binding' is used herein to refer to a binding between a filter rule and an interface in general, whether it is using an FIID, an FID, a combination of a home address and an FID or any other means to identify the filter rule being bound to an interface.

Typically the filter rules for outgoing and incoming packets are symmetric, such that outgoing and incoming packets of the same flow are transferred via the same access interface, but asymmetric filter rules are also possible.

Filter rules can potentially be a very useful flow management tool in a simultaneous multi-access environment, but managing filter rules in conjunction with PMIPv6 is problematic.

One problem stems from the fact that the MN should not be aware of its LMA and should not have a direct relation to it (ideally the MN should not even have to be aware of that it is being served by PMIPv6). The MN can therefore not transfer filter rules directly to the LMA.

Another problem of filter rule management in conjunction with PMIPv6 is that when monami6 signalling is used for PMIPv6, it becomes problematic to integrate the filter rule-BID binding signalling. The reason is that the PMIPv6/monami6 messages, and in particular Proxy Binding Updates (PBUs), are sent from the MAGs instead of from the MN. A MAG does not have an overview of all of the accesses in use by the MN. Furthermore, a MAG is not aware of the filter rules that the MN has created (or otherwise installed) and their filter rule-interface bindings. A MAG therefore cannot signal filter rule-BID bindings to the LMA on behalf of the MN.

A scenario that further complicates filter rule management is when a MN is attached to multiple different access links connected to the same MAG, as illustrated in FIG. 3. In this case filter rules must be installed not only in the MN and the LMA, but also in the MAG 2 (in the example of FIG. 3) in order for the MAG 2 to know over which of its access links it should send a downlink packet. All MAGs advertise the same (home) prefix to a MN, and so the MN will not be able to distinguish the scenario illustrated in FIG. 3 from scenarios where the different access links belong to different MAGs. A way to allow the MN to distinguish this scenario is to provide each MAG with a different link-local address and configure the same link-local address on all access link interfaces of the same MAG. However, such a scheme might interfere with one of the suggestions in S. Gundavelli et al., "Proxy Mobile IPv6", Internet-Draft draft-sgundave-mip6-proxymip6-02, March 2007, which is to configure the same link-local address for all MAGs in the same PMIPv6 domain.

One of the problems in handling simultaneous multi-access scenarios in a proxy mobile communications network is a lack of control of how CoAs for the MN (and thus accesses) are handled in the LMA. That is, a MN has no way of indicating how the accesses should to be used in terms of PMIPv6, for example whether a new access should be added to the already used accesses, or replace one or more old accesses. Neither the MAGs nor the LMA have any way of anticipating the MNs intentions. Furthermore, there is a lack of coordinated BID assignment. Even if a MAG did know whether a new CoA should be added to the existing CoAs or replace an old one, it would not know which BIDs other MAGs in the network have assigned to the existing CoAs. An additional problem is that the MN cannot send filter rules directly to the LMA, because it has no direct relation with the LMA, does not know the LMA's IP address and ideally the MN is not even aware that it is being served by an LMA. Furthermore, using filter rule-BID binding signalling integrated in PMIPv6/monami6 messages is problematic, because the MAGs, which handle the PMIPv6/monami6 signalling on behalf of the MN, do not have the necessary overview of the accesses that the MN is using. The MAGs are also not aware of the filter rules that the MN has created (or otherwise installed) and their filter rule-interface bindings. Hence a MAG cannot signal filter rule-BID bindings to the LMA on behalf of the MN. WO 2007/039016 describes a method of allowing simultaneous use of a home network and a foreign network by a multihomed MN, but does not allow for control of handling CoAs for the MN.

A general property of the above mechanisms is that they are terminal centric in the sense that the control of flow management is placed in the MN. This is a problem in certain scenarios where operator control is given high priority, for example in some cellular networks.

There is a need for a solution that overcomes the above-described problems of lack of control and coordination of CoAs and BID assignment as well as filter rule management. In addition, it would be desirable to provide a solution that allows more operator control of these mechanisms.

SUMMARY

In order to mitigate the above-described problems, the inventor has devised a method and apparatus in which an Access Selection (AS) server is informed of the whereabouts of the MN from various entities in the network. This information allows the AS server to control how CoAs are registered in the LMA and how different flows are sent over the different accesses, by assigning a BID that the MAG associates with a CoA to be registered in a mobility anchor node such as a Local Mobility Anchor. The AS server also distributes filter rules related to the MN to the nodes concerned, for example the LMA and possibly the MN.

According to a first aspect of the invention, there is provided a method for use in a communications network in which a Mobile Node accesses the communications network via a proxy node. At an access control node that controls the access of the Mobile Node, attachment information is received from the proxy node. The attachment information relates to an attachment to the communications network of the Mobile Node, and includes an identifier of the Mobile Node. On the basis of the received information, the node determines a Binding Unique Identifier to associate with a Care-of-Address used by the proxy node on behalf of the Mobile Node. The Binding Unique Identifier is then sent to the proxy node for subsequent registration with a mobility anchor function. The method provides a network-centric approach to assigning Binding Unique Identifiers to Mobile Nodes that attach to the network.

Optionally, an existing Binding Unique Identifier is associated with the Care-of-Address, or alternatively a unique Binding Unique Identifier is associated with the Care-of-Address. These alternatives are used for replacement of an existing Care-of Address and addition of a new Care-of Address respectively.

The method optionally further comprises determining at least one filter rule relevant to the Care-of-Address of the Mobile Node and binding a filter rule identifier obtained from the filter rule to the determined Binding Unique Identifier. The filter rule is then sent to the mobility anchor function, and the filter rule identifier and binding is sent to the proxy node for subsequent registration with the mobility anchor function.

If it is desired to give the Mobile Node more control over its use of filter rules, the filter rule is optionally sent to the Mobile Node.

The method optionally comprises using at least one policy relating to the Mobile Node to determine the Binding Unique Identifier to associate with the Care-of-Address. This allows a network operator to determine the Binding Unique Identifier in accordance with network policies. The policies may be obtained from a database at the access control node, or may be obtained from a remote node. In many cases, a network operator will want to apply more than one policy, and so the method optionally comprises storing a plurality of policies at the access control node. In the case where policies are retrieved from a remote node, the remote node is optionally selected from any of a Home Subscriber Server, a Subscriber Profile Repository, a Policy and Charging Rules Function, and a Policy Server.

Information relating to an access of the Mobile Node is optionally sent to the access control node from any one of the Mobile Node, a Mobile Access Gateway, an Authentication, Authorization & Accounting server, a Radio Resource Control entity and a radio network node. These nodes can all provide information about the Mobile Node which can be useful in, for example, determining policies to apply, or whether or not a Care-of Address is to be replaced or added.

The communications network is optionally selected from one of a Proxy Mobile IPv4 network and a Proxy Mobile IPv6 network, in which case the mobility anchor function is a Local Mobility Anchor, and the proxy node is a Mobile Access Gateway.

The access control node is optionally selected from any of an Access Selection Server and an Access Network Discovery and Selection Function node, as these nodes are suitable for controlling the access of a Mobile Node.

According to a second aspect of the invention, there is provided an access control node for use in a communications network in which a Mobile Node accesses the communications network via a proxy node. The access control node comprises means, such as a receiver, for receiving attachment information from the proxy node, the attachment information relating to an attachment to the communications network of the Mobile Node and comprising an identifier identifying the Mobile Node. The access control node further comprises means for determining, on the basis of the received information, a Binding Unique Identifier to associate with a Care-of-Address used for the Mobile Node, a transmitter for sending the Binding Unique Identifier to the proxy node for subsequent registration with a mobility anchor function.

The access control node optionally comprises means for determining at least one filter rule relevant to the Care-of-Address of the Mobile Node, means for binding a filter rule identifier obtained from the filter rule to the determined Binding Unique Identifier, means for sending the filter rule to the mobility anchor function, and means for sending the filter rule identifier and binding to the proxy node for subsequent registration with the mobility anchor function.

In cases where it is desirable to provide the Mobile Node with the filter rule, the access control node optionally comprises means for sending the filter rule to the Mobile Node.

In order to allow a network operator to determine a Binding Unique Identifier in accordance with a network policy, the access control node optionally comprises means for using at least one policy relating to the Mobile Node to determine a Binding Unique Identifier to associate with the Care-of-Address. Furthermore, the access control node optionally comprises means for using at least one policy relating to the Mobile Node to determine a filter rule to be used for the Mobile Node and to determine the Binding Unique Identifier to which the filter rule identifier should be bound.

The access control node optionally comprises a memory for storing a plurality of policies at the access control nod, or alternatively the access control node comprises means for obtaining policies from a remote node. Optionally, the access control node additionally or alternatively comprises a receiver for receiving policies from a remote node in the communications network, the remote node being selected from any of a Home Subscriber Server, a Subscriber Profile Repository, a Policy and Charging Rules Function, and a Policy Server.

According to a third aspect of the invention, there is provided a proxy node for use in a communications network in which a Mobile Node accesses the communications network via the proxy node. The proxy node comprises a receiver for receiving from the Mobile Node a message requesting attachment of the Mobile Node to the network via the proxy node. The proxy node further comprises a transmitter for sending attachment information to an access control node, the attachment information comprising an identifier identifying the Mobile Node, and means for receiving from the access control node a Binding Unique Identifier associated with a Care-of-Address used for the Mobile Node. The proxy node also comprises means for sending the Binding Unique Identifier, the Care-of-Address, and the association between the Binding Unique Identifier and the Care-of-Address to a mobility anchor function.

The proxy node optionally comprises means for receiving a filter rule identifier and information associating the filter rule identifier with the Binding Unique Identifier from the access control node, and means for transmitting the filter rule identifier and information associating the filter rule identifier with the Binding Unique Identifier to the mobility anchor function.

According to a fourth aspect of the invention, there is provided a Local Mobility Anchor for use in a communications network in which a Mobile Node accesses the communications network via a proxy node. The Local Mobility Anchor comprises a receiver for receiving from the proxy node a Care-of-Address associated with the Mobile Node, a Binding Unique Identifier relating to the Mobile Node and an association between the Binding Unique Identifier and the Care-of-Address.

The Local Mobility Anchor optionally comprises means for receiving from the proxy node a filter rule identifier and information associating the filter rule identifier with the Binding Unique Identifier, and means for receiving from an access control node at least one filter rule associated with the filter rule identifier.

DETAILED DESCRIPTION

Figure 1:
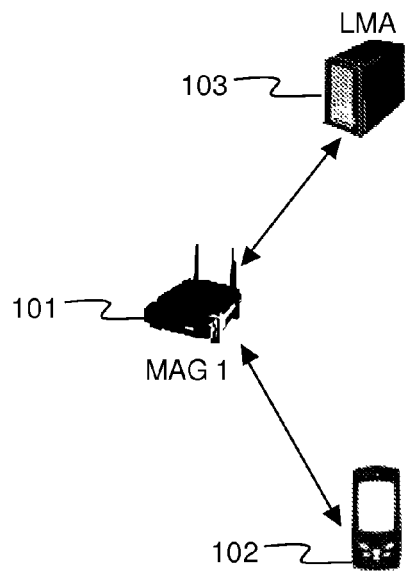
FIG. 1 illustrates schematically in a block diagram a Proxy Mobile IPv6 architecture.
Figure 2:
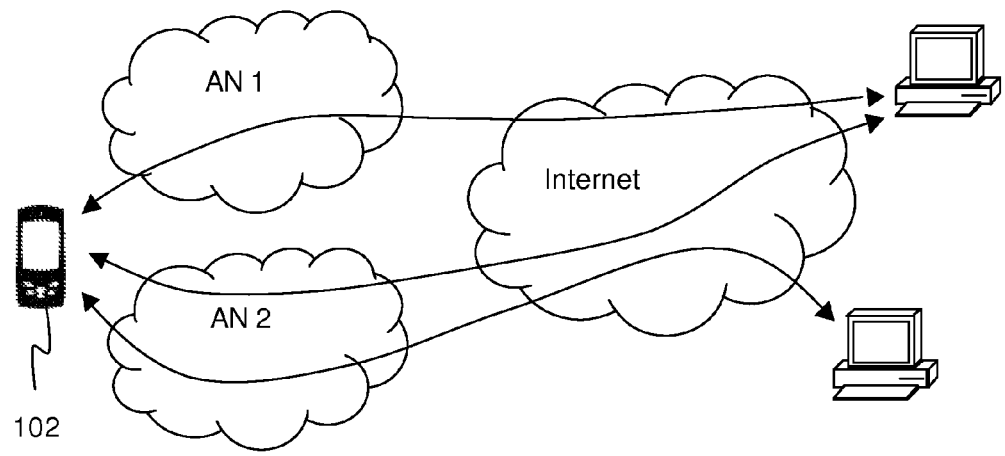
FIG. 2 illustrates schematically in a block diagram a Simultaneous Multi-Access architecture.
Figure 3:
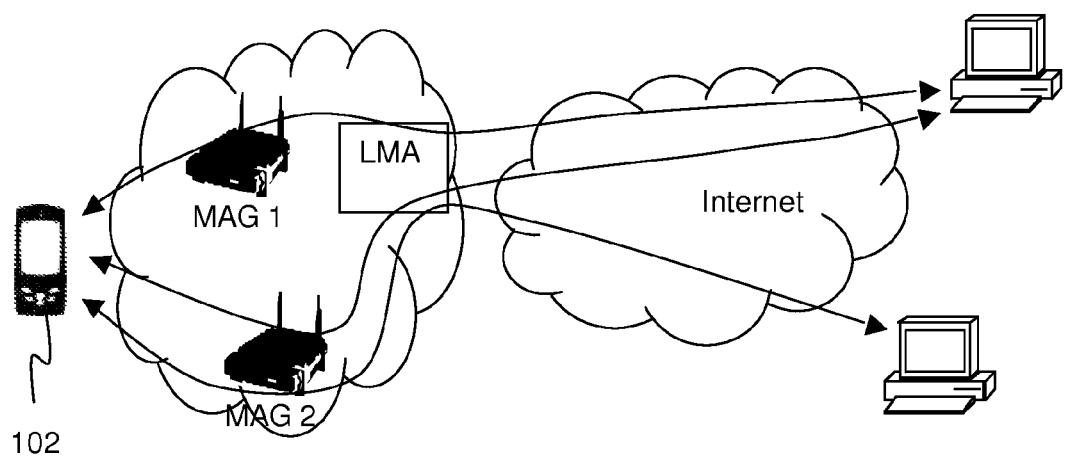
FIG. 3 illustrates schematically in a block diagram a Simultaneous Multi-Access scenario in a Proxy Mobile IPv6 architecture.
Figure 4:
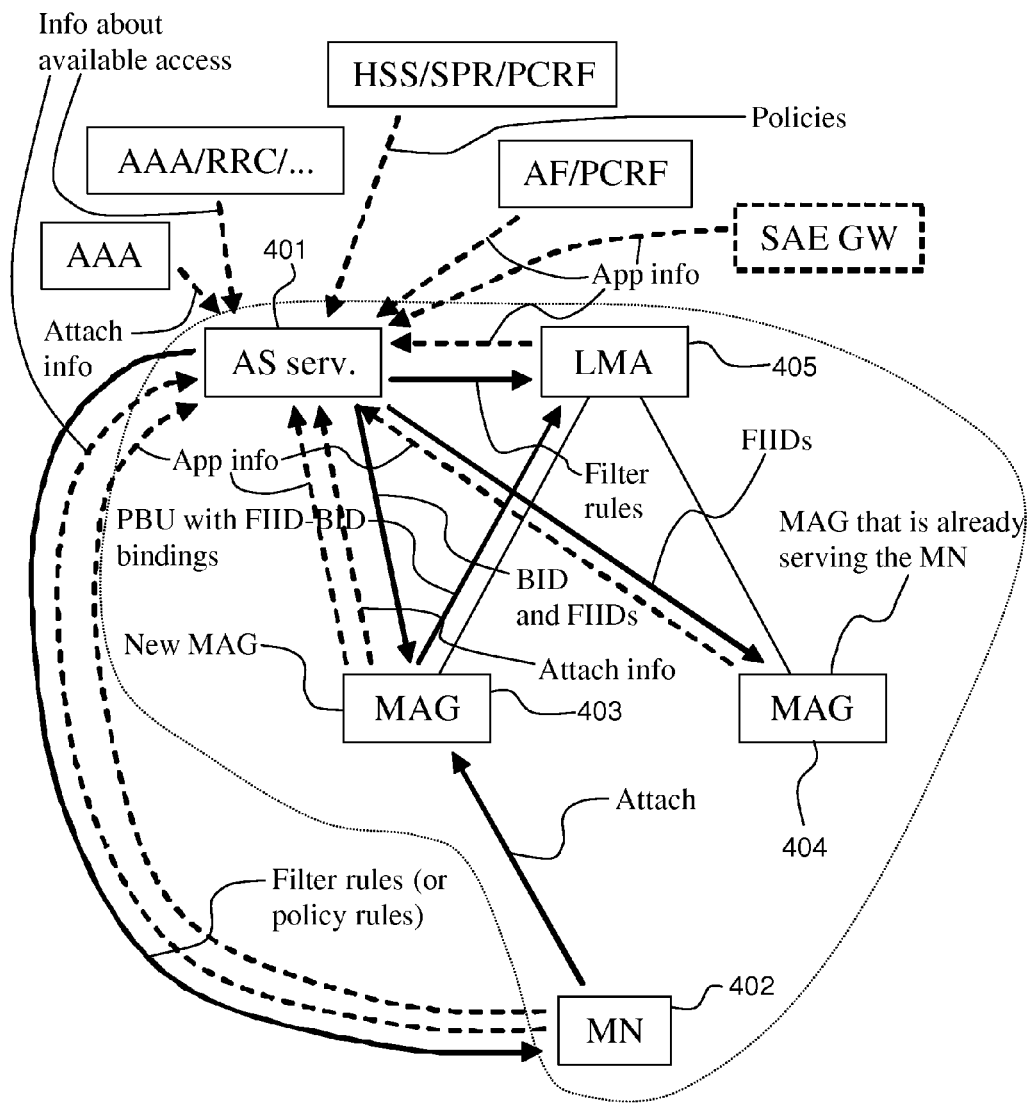
FIG. 4 illustrates schematically in a block diagram signalling and system architecture of a communication network according to an embodiment of the invention.

The following description sets forth specific details, such as particular embodiments, procedures, techniques, etc. for purposes of explanation and not limitation. It will be appreciated by one skilled in the art that other embodiments may be employed apart from these specific details. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

In a first embodiment of the invention, an Access Selection (AS) server 401 is provided in a communications network. The AS server 401 is informed of the whereabouts, and other contextual information, of a MN 402 from various entities in the network. Information about available accesses can be sent from the MN, from Radio Resource Control (RRC) entities, MAGs 403, 404, an Authentication, Authorization and Accounting (AAA) server, or radio network entities. Information about network attachment of the MN can be provided by MAGs or the AAA server. Application Functions (AFs), a network gateway (e.g. a MAG or a LMA 405/SAE Gateway), or the MN itself provide Information about initiated applications. This information is used by the AS server to obtain an overview that allows it to make decisions regarding control of how accesses are used, and in particular in terms of how CoAs are registered in the LMA 405 and how different flows are sent over the different accesses.

In order to control registration of CoAs used by the MN 402 in the LMA 405 (i.e. taking a decision as to whether to replace old CoAs or add to existing CoAs), the AS server 401 assigns the BIDs that the MAGs 403, 404 associate with the CoAs registered in the LMA 405. To control flow management, the AS server 401 transfers filter rules to the LMA 405 and the MN 402, and sends filter rule identifiers (such as FIIDs, FIDs, or a combination of a home address and a FID, as described above) to the MAGs 403, 404 with instructions on how to bind them to BIDs. The MN 402 can also generate filter rules independently, based on policy rules received from the AS server 401 or alternatively from another node or even preconfigured in the MN (e.g. on a SIM/USIM card). The AS server 401 uses policies in order to control access selection and filter rule generation. The policies can either be retrieved from an external source such as a Home Subscriber Server (HSS), a Subscriber Profile Repository (SPR), a Policy and Charging Rules Function (PCRF) or another type of Policy Server, and/or the policies can be configured in the AS server.

In more detail, the AS server 401 has the same overview of available accesses as the MN 402. This information is reported to the AS server 402 from any of the MN 402, from RRC entities in the network, from MAGs (i.e. access routers) or radio network nodes that the MN attaches to, and/or from an AAA server (which is involved when a MN first attaches to the network). With this overview, and with its role as the access selector, the AS server 401 is well suited to control how CoAs used by the MN 402 are registered in the LMA 405.

The AS server 405 controls registration of CoAs by assigning BIDs that the MAGs 403, 404 associate with CoAs and register in the LMA 405. This central coordination of BID assignment allows the AS server 401 to control whether a new CoA should replace an old one (by assigning an existing BID to the new CoA), or be added to the existing CoAs (by assigning a unique BID to the new CoA). The AS server 401 uses policies as a basis for these decisions. It should be noted that the AS server 401 does not have to know the actual CoAs that are used for the MN 402. It is enough that the AS server 401 can associate the MN's 402 available accesses with the MN 402. Thus, any unique identifier associated with the MN 402 is sufficient for the AS server 401, e.g. a NAI or a home address or an IMSI.

When a MN 402 attaches to a MAG 403, the MAG 403 informs the AS server 401 (or alternatively the AS server 401 is informed via other channels, e.g. by the AAA server) that the MN 402 has attached to the MAG 403. When informing the AS server 401 of the attachment, a unique identifier of the concerned MN 402, e.g. a NAI, a home address or an IMSI, is conveyed to the AS server 401. The CoA that the MAG 403 assigns to the MN 402 may also be conveyed to the AS server 401, but this is optional and not necessary. The AS server 401 then assigns a BID (to be associated with the CoA that the MAG will register in the LMA) and sends the BID to the MAG 403 together with instructions on how to set the flags in the BID sub-option in a Proxy Binding Update (PBU).

Figure 5:
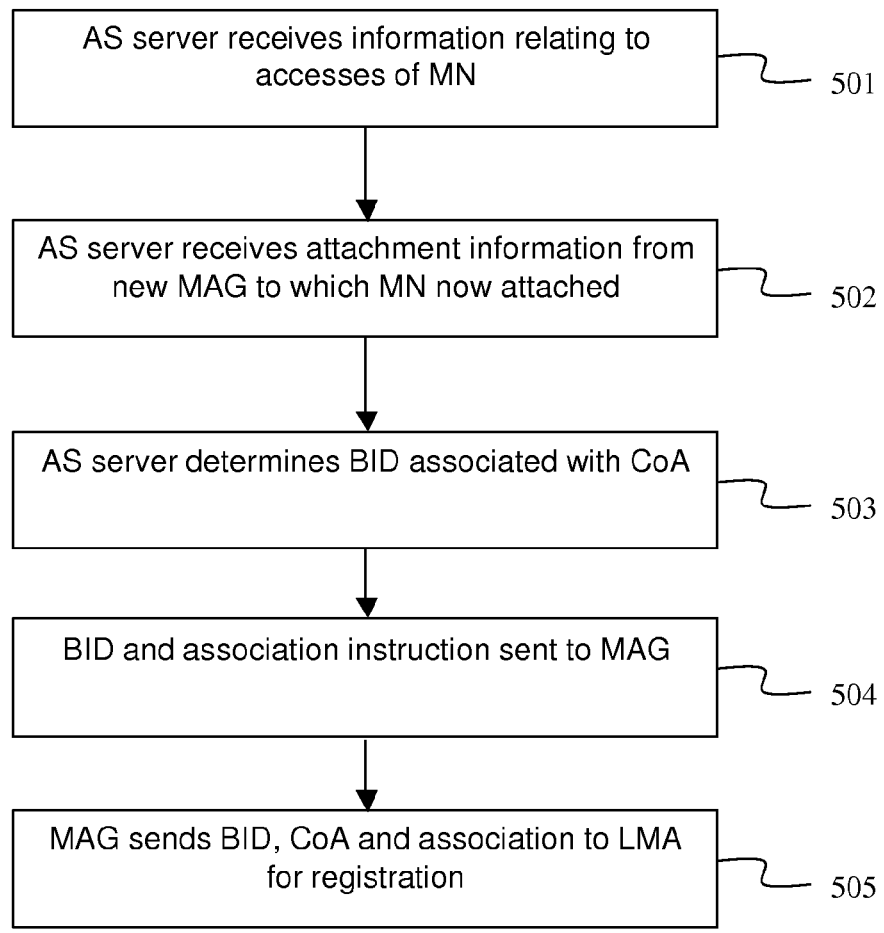
FIG. 5 is a flow diagram illustrating the steps of an embodiment of the invention.

These steps are illustrated in FIG. 5, with the following numbering referring to the numbering used in FIG. 5:

501. The AS server receives information from various nodes relating to accesses of the MN;
502. When the MN attaches to a new MAG, the AS server receives attachment information relating to the attachment. The information includes a unique identifier identifying the MN, for example a NAI, a home address or an IMSI;
503. On the basis of policies and the information received from various nodes, the AS server determines a BID to be associated with the CoA that the MAG is using for the MN;
504. The BID and the association instruction are sent to the MAG; and
505. The MAG sends the BID, the CoA, and the association to the LMA for registration.

Figure 6:
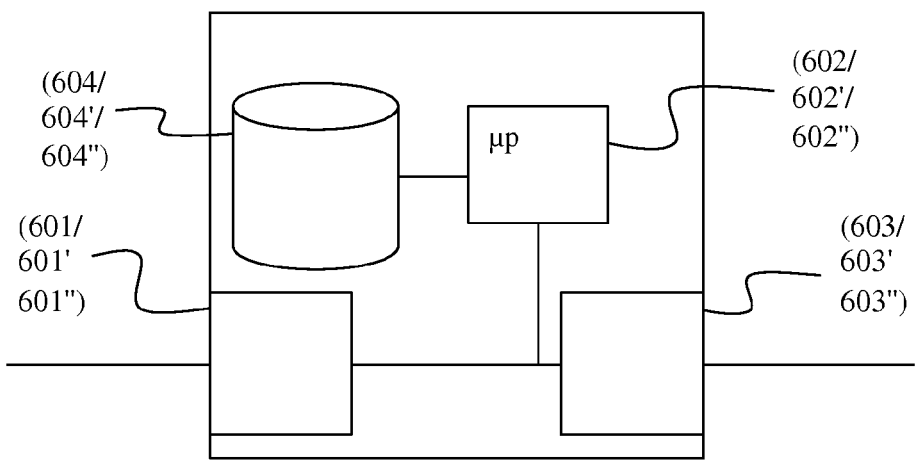
FIG. 6 illustrates schematically in a block diagram a node for use according to embodiments of the invention.

Referring to FIG. 6 herein, there is illustrated a node for use in a Proxy Mobile IP communications network. In one embodiment the node is an access control node such as an Access Selection server. The AS server comprises a receiver 601 for receiving signalling from various nodes including MAGs. This could be one physical receiver, or different physical receivers for receiving information from different entities. The AS server further comprises a processor 602 arranged to determine a BID to associate with a CoA, and a transmitter 603 for sending signalling to the MAG and the LMA. Again, the transmitter may be one physical transmitter or different physical transmitters for communicating with different entities. The AS server further comprises a memory 604.

The node of FIG. 6 may also illustrate a proxy node such as a MAG. The MAG comprise one or more receivers 601' for receiving information from various entities including the MN and the AS server. The MAG further comprises a processor 602', and one or more transmitters 603' for transmitting signalling to various entities including the LMA and the AS server. The MAG may further comprise a memory 604'.

The node of FIG. 6 may also illustrate a mobility anchor node such as an LMA. The LMA comprises one or more receivers 601" for receiving communications from one or more MAGs and other entities, such as an AS server. The LMA further comprises a processor 602", and a memory 604" for storing filter rule identifiers, BIDs, and mapping information. The LMA further comprises one or more transmitters 603" for sending signalling to other network entities.

If simultaneous multi-access is not supported for the MN 402 (this may be due to the capabilities of the MN or due to subscription restrictions), the MAG 403 is informed using AAA communications during the network access procedure. In this case, the MAG 403 need not inform the AS server 401 of the MN's 402 attachment (unless this is required for other purposes), and need not wait for a BID to be assigned (since no BID is needed when registering the CoA for the MN 402). Alternatively, the MAG 403 is informed by the AS server 401 that no BID is needed for the MN 402.

In a further embodiment, the AS server 402 handles flow management on behalf of the MN, in addition to controlling BID assignment and CoA management. In this case, the AS server has access to relevant policies (either obtained from the HSS, SPR, PCRF or another repository, or configured in the AS server itself) and can generate filter rules accordingly. The filter rules are either pre-created, or triggered by application initiations. Initiation of an application that involves a 3GPP based service (IMS or non-IMS) are indicated to the AS server from the AF or the PCRF, or any other suitable node. Other services, e.g. Internet based services, are identified by snooping port numbers in a gateway (e.g. the MAG or the LMA/SAE Gateway). Explicit signalling that an application has been started, sent from the MN 402 to the AS server 401 may be used. The AS server 401 is also made aware of when the MN 402 attaches to a new access (and detaches from an old access), as described above. This is communicated to the AS server 401 from any suitable node, typically either from the MAGs or from the AAA server.

The AS server 401 transfers created or updated filter rules as well as filter rule deletion indications to the LMA 405 and to the MN 402. When sending filter rules to the LMA 405, the AS server 401 can use the filter rule transfer protocol as described in C. Larsson et al., "A Filter Rule Mechanism for Multi-access Mobile IPv6", Internet-Draft draft-larsson-monami6-filter-rules-02, March 2007. The same protocol can be used when transferring filter rules to the MN 402, or alternatively an AS client-server protocol can be used. Rather than transferring filter rules, the MN 402 and the AS server 401 can generate the same filter rules independently of each other based on the same policy rules. Policy rules may be transferred from the AS server 401 to the MN 402, but they may also be conveyed from another node or even be preconfigured in the MN (e.g. on a SIM/USIM card).

The AS server 401 transfers to the relevant MAG 403 filter rule identifiers to be bound to the BID that the MAG 403 registers for the MN 401 (as well as instructions on any filter rule-BID bindings to be deleted). The AS server 401 either sends these filter rule identifiers together with the assigned BID, or in a separate message, for example using the filter rule transfer protocol. In any case the MAG 403 only sends the subsequent PBU to the LMA 405 after it has received both the assigned BID and the filter rule identifiers to be bound to the BID (or an indication that no filter rule identifiers should be bound to the BID). This ensures that the MAG 403 does not send double PBUs to the LMA 405, i.e. one PBU to register the CoA and BID, triggered by the MN's attachment, and a subsequent PBU to bind the filter rule identifiers to the BID.

If simultaneous multi-access is not supported for the MN 401, the MAG 403 is informed, as described above, and does not wait for filter rule-BID binding instructions before sending a PBU to the LMA 405.

To handle the multi-access link MAG scenario the MAG (or AAA server or other source) would have to inform the AS server of which access link a MN attaches to as well as if the MN switches to (or adds to the previous attached access link) another of the MAG's access links. The AS server would have to transfer filter rules, not only filter rule identifiers, to the multi-access link MAG to be installed in the MAG and instructions for how these filter rules or their filter rule identifiers should be bound to the different access links of the MAG. These filter rules are needed to control the access selection for downlink packets.

In an alternative embodiment, a multi-access link MAG uses a different CoA (i.e. a different MAG-LMA tunnel) for each access link. In this case the AS server 401 does not transfer the complete filter rules to the MAG, because there is an unambiguous association between each MAG-LMA tunnel (and thus CoA) and an access link. With this alternative embodiment the AS server assigns one BID for each CoA that the MAG is using for a MN.

In a further embodiment, otherwise compatible with the earlier-described embodiments, the AS server 401 handles the PMIPv6 signalling towards the LMA 405 on behalf of the MAGs (using the 'alternate CoA' feature).

The above described invention provides a solution to the problems of a lack of control of how accesses/CoAs are replaced by or added to each other, a lack of coordinated BID assignment, a lack of means to convey filter rules to the PMIPv6 LMA, a lack of means to control and indicate how filter rules or filter rule identifiers are bound to BIDs in the LMA, and a lack of direct operator control of access selection, access management and flow management (on behalf of a MN) in a simultaneous multi-access scenario. Furthermore, the invention allows an operator to maintain control of access selection, including CoA management, and flow management in a simultaneous multi-access scenario. The invention is compatible with multi-access link MAG scenarios, and allows a PMIPv6 LMA (or a multi-access link MAG) to use bi-casting (or "n-casting") over multiple accesses for the purpose of load balancing or capacity aggregation, as controlled by filter rules and filter rule bindings. The invention is suitable in network/operator centric environments, e.g. 3GPP SAE, where the AS server is equivalent to an ANDSF (Access Network Discovery and Selection Function) server/controller.

It will be appreciated by the person of skill in the art that various modifications may be made to the above-described embodiments without departing from the scope of the present invention. For example, whilst the invention is described using the examples of Proxy MIP or PMIPv6, it will be appreciated that it may also be used for any protocol that supports proxy gateways that handle mobility signalling on behalf of another node.

The following acronyms have been used in this specification:
3GPP 3rd Generation Partnership Project
AAA Authentication, Authorization & Accounting
AF Application Function
ANDSF Access Network Discovery and Selection Function
AS Access Selection
BID Binding Unique Identification number
BU Binding Update
CN Correspondent Node
CoA Care-of Address
FID Flow Identifier
FIID Filter Interface Identifier
HA Home Agent
HSS Home Subscriber Server
IMS IP Multimedia Subsystem
IMSI International Mobile Subscriber Identity
IP Internet Protocol
IPv6 Internet Protocol version 6
LMA Local Mobility Anchor
MAG Mobile Access Gateway
MIPv6 Mobile IPv6
MN Mobile Node
NAI Network Access Identifier
PBU Proxy Binding Update
PCRF Policy and Charging Rules Function
PMIPv6 Proxy Mobile IPv6
RFC Request For Comments
RRC Radio Resource Control
SAE System Architecture Evolution
SAE GW SAE Gateway
SIM Subscriber Identity Module
SPR Subscriber Profile Repository
USIM Universal Subscriber Identity Module

The invention claimed is:

1. A method for use in a communications network in which a Mobile Node accesses the communications network via a proxy node, the method comprising:
   receiving, at an access control node, information from various nodes in the communications network relating to accesses of the Mobile Node to the communications network;
   receiving, at the access control node, attachment information from the proxy node, the attachment information relating to an attachment to the communications network of the Mobile Node and comprising an identifier of the Mobile Node;
   on the basis of the received information from various nodes and attachment information from the proxy node, determining, at the access control node, a Binding Unique Identifier to associate with a Care-of-Address used by the proxy node on behalf of the Mobile Node, wherein the Care-of-Address is associated with one selected from the group consisting of an existing Binding Unique Identifier and a unique Binding Unique Identifier; and
   sending, by the access control node, the Binding Unique Identifier associated with the Care-of-Address to the proxy node for subsequent registration with a mobility anchor function using the Binding Unique Identifier.

2. The method according to claim 1, further comprising:
   determining at least one filter rule relevant to the Care-of-Address of the Mobile Node;
   binding a filter rule identifier obtained from the filter rule to the determined Binding Unique Identifier;
   sending the filter rule to the mobility anchor function; and
   sending the filter rule identifier and binding to the proxy node for subsequent registration with the mobility anchor function.

3. The method according to claim 2, further comprising sending the filter rule to the Mobile Node.

4. The method according to claim 1, further comprising using at least one policy relating to the Mobile Node to determine the Binding Unique Identifier to associate with the Care-of-Address.

5. The method according to claim 4, further comprising storing a plurality of policies at the access control node.

6. The method according to claim 5, wherein the at least one policy is retrieved from a remote node in the communications network, the remote node being selected from the group consisting of: a Home Subscriber Server, a Subscriber Profile Repository, a Policy and Charging Rules Function, and a Policy Server.

7. The method according to claim 1, wherein information relating to an access of the Mobile Node is received from a node selected from the group consisting of: the Mobile Node, a Mobile Access Gateway, an Authentication, Authorization & Accounting server, a Radio Resource Control entity and a radio network node.

8. The method according to claim 1, wherein
the communications network is selected from the group consisting of: a Proxy Mobile IPv4 network and a Proxy Mobile IPv6 network;
the mobility anchor function is a Local Mobility Anchor;
the proxy node is a Mobile Access Gateway; and t
the access control node is selected from the group consisting of: an Access Selection Server and an Access Network Discovery and Selection Function node.

9. An access control node for use in a communications network in which a Mobile Node accesses the communications network via a proxy node, the access control node comprising:
  a receiver for receiving information from various nodes in the communications network relating to accesses of the Mobile Node to the communications network
  a receiver for receiving attachment information from the proxy node, the attachment information relating to an attachment to the communications network of the Mobile Node and comprising an identifier identifying the Mobile Node;
  a processor for determining, on the basis of the received information from various nodes and attachment information, a Binding Unique Identifier to associate with a Care-of-Address used for the Mobile Node;
  a transmitter for sending the Binding Unique Identifier to the proxy node for subsequent registration of the Binding Unique Identifier with a mobility anchor function
  means for determining at least one filter rule relevant to the Care-of-Address of the Mobile Node;
  means for binding a filter rule identifier obtained from the filter rule to the determined Binding Unique Identifier;
  means for sending the filter rule to the mobility anchor function; and
  means for sending the filter rule identifier and binding to the proxy node for subsequent registration with the mobility anchor function.

10. The access control node according to claim 9, further comprising means for sending the filter rule to the Mobile Node.

11. The access control node according to claim 9, further comprising a group consisting of:
  means for using at least one policy relating to the Mobile Node to determine a Binding Unique Identifier to associate with the Care-of-Address;
  means for using at least one policy relating to the Mobile Node to determine a filter rule or filter rule identifier to be used for the Mobile Node, and to determine the Binding Unique Identifier to which the filter rule identifier of the filter rule should be bound;
  a memory for storing a plurality of policies at the access control node; and
  a receiver for receiving policies from a remote node in the communications network, wherein
    the remote node is selected from the group consisting of: a Home Subscriber Server, a Subscriber Profile Repository, a Policy and Charging Rules Function, and a Policy Server.

12. A proxy node for use in a communication network in which a Mobile Node accesses the communications network via the proxy node, the proxy node comprising:
  a receiver for receiving from the Mobile Node a message requesting attachment of the Mobile Node to the network via the proxy node;
  a transmitter for sending attachment information to an access control node, the attachment information comprising an identifier identifying the Mobile Node;
  a receiver for receiving from the access control node a Binding Unique Identifier associated with a Care-of-Address used for the Mobile Node, wherein the Binding Unique Identifier is determined by the access control node based on information from various nodes in the communications network relating to access of the Mobile Node to the communications network and the attachment information;
  a transmitter for sending the Binding Unique Identifier, the Care-of-Address, and the association between the Binding Unique Identifier and the Care-of-Address to a mobility anchor function;
  a receiver for receiving a filter rule identifier and information associating the filter rule identifier with the Binding Unique identifier from the access control node; and
  a transmitter for transmitting the filter rule identifier and information associating the filter rule identifier with the Binding Unique Identifier to the mobility anchor function.

* * * * *

UNITED STATES PATENT AND TRADEMARK OFFICE
CERTIFICATE OF CORRECTION

PATENT NO. : 8,391,226 B2  
APPLICATION NO. : 12/744888  
DATED : March 5, 2013  
INVENTOR(S) : Rune Page 1 of 1

It is certified that error appears in the above-identified patent and that said Letters Patent is hereby corrected as shown below:

On the Title Page, in Item (56), under "FOREIGN PATENT DOCUMENTS", in Column 2, Line 1, delete "WO 2007/035016 A" and insert -- WO 2007/039016 A --, therefor.

In the Specifications

In Column 1, Line 18, delete "Over" and insert -- over --, therefor.

In Column 1, Line 23, delete "care-of address" and insert -- Care-of Address --, therefor.

In Column 8, Line 52, delete "AS server 402" and insert -- AS server 401 --, therefor.

In Column 8, Line 59, delete "AS server 405" and insert -- AS server 401 --, therefor.

In Column 10, Line 6, delete "AS server 402" and insert -- AS server 401 --, therefor.

In Column 10, Line 43, delete "MN 401" and insert -- MN 402 --, therefor.

In Column 10, Lines 55-56, delete "MN 401," and insert -- MN 402, --, therefor.

In Column 12, Line 10, delete "Module" and insert -- Module. --, therefor.

In the Claims

In Column 13, Line 6, in Claim 8, delete "and t" and insert -- and --, therefor.

In Column 13, Line 16, in Claim 9, delete "network" and insert -- network; --, therefor.

In Column 13, Line 28, in Claim 9, delete "function" and insert -- function; --, therefor.

Signed and Sealed this  
Eleventh Day of June, 2013

Teresa Stanek Rea  
*Acting Director of the United States Patent and Trademark Office*